(12) United States Patent
Moy et al.

(10) Patent No.: US 6,419,717 B2
(45) Date of Patent: Jul. 16, 2002

(54) CARBON NANOTUBES IN FUELS

(75) Inventors: David Moy, Winchester; Chunming Niu, Lexington, both of MA (US); Howard Tennent, Kennett Square, PA (US); Robert Hoch, Hensonville, NY (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 0 days.

(21) Appl. No.: 09/809,930

(22) Filed: Mar. 16, 2001

Related U.S. Application Data

(60) Provisional application No. 60/190,308, filed on Mar. 17, 2000, now abandoned.

(51) Int. Cl.$^7$ .................................................. C10L 1/12
(52) U.S. Cl. ................................ 44/457; 585/1; 585/14
(58) Field of Search ....................... 44/457, 300; 585/1, 585/14

(56) References Cited

U.S. PATENT DOCUMENTS 5,258,048 A * 11/1993 Whewell ...................... 44/282
5,639,984 A * 6/1997 Nielsn ........................ 102/336

* cited by examiner

*Primary Examiner*—Cephia D. Toomer
(74) *Attorney, Agent, or Firm*—Kramer Levin Naftalis & Frankel LLP; Barry Evans, Esq.

(57) ABSTRACT

Improved fuel compositions containing carbon nanotubes in from 0.01% to 30.0% by weight of fuel have improved bum rate and other valuable properties. Improved lubricant compositions containing carbon nanotubes in from 0.01 to 20.0% by weight of lubricant have improved viscosity and other valuable properties.

4 Claims, No Drawings

CARBON NANOTUBES IN FUELS

This application claims benefit of provisional Application No. 60/190,308, filed Mar. 17, 2000, now abandoned.

BACKGROUND OF THE INVENTION

1. Field of Invention

The invention relates to the field of fuels and lubricants. More specifically, the invention pertains to the use of carbon nanotubes in liquid fuels and lubricants to accelerate the burning rate, dissipate electrostatic changes and/or increase viscosity.

2. Description of the Related Art

Various techniques for improving the combustion efficiency of petroleum products such as gasoline, gas oil, kerosene, heavy oil and lubricant oil have been investigated. Additives are used with various fuels such as liquefied petroleum gas, gasoline, diesel fuel, fuel oil, and the like to enhance the combustion characteristics of the fuel to reduce polluting emissions of carbon monoxide, particulates and unburned hydrocarbons, and to reduce equipment problems.

Although many additives are effective for reducing the amount of polluting emissions caused by incomplete combustion of fuels, there remains a need in the art for novel methods of enhancing the burning rate of fuels and improving the octane or cetane number as well as reducing their susceptibility to electrostatic discharge.

OBJECTS OF THE INVENTION

It is an object of the present invention to improve the properties of fuels and lubricants.

It is another object of the invention to increase the burning rate of fuels.

It is yet another object of the invention to render fuel and lubricants conductive.

It is yet another object of the invention to provide combustible additives which increase the viscosity of fuels and lubricants.

Other improvements which the present invention provides over the prior art will be identified as a result of the following description which sets forth the preferred embodiments of the invention.

SUMMARY OF THE INVENTION

The present invention which addresses the needs of the prior art provides methods of enhancing the combustion efficiency of fuels by utilizing carbon nanotubes as additives. When added to fuels in an amount from about 0.01% to about 15% by weight, carbon nanotubes can enhance the burning rate, function as anti-knock additives, render the fuels conductive and increase their viscosity.

Carbon nanotubes in an amount from about 0.01% to about 5% by weight can also increase the viscosity of lubricants.

DETAILED DESCRIPTION OF THE INVENTION

Fuels and Lubricants

Fuels as used herein refer broadly to liquid organic substances containing primarily hydrogen, carbon, oxygen, which are capable of producing energy in a chemical reaction. Fuels as used herein, include liquids that are burned to generate heat or are used in an engine to generate power. The fuel may be, for example a distilled fraction of petroleum, a product of refinery operations, a crude petroleum or a blend of two or more thereof.

Liquid hydrocarbon oils, especially petroleum products such as gasoline, gas oil, kerosene, and heavy oil are preferred fuels of primary interest in the invention. Fuels which can benefit from the use of carbon nanotubes as additives also include, without limitations, diesel oil, fuels cited in Lack, U.S. Pat. No. 5,823,758 and Sato, U.S. Pat. No. 5,880,047, both incorporated herein by reference.

Lubricants as used herein are primarily organic substances containing primarily carbon, hydrogen and oxygen, e.g., broadly oils from petroleum consisting essentially of complex mixtures of hydrocarbon molecules. More specifically, lubricating or "lube oil" refers to a selected fraction of refined mineral oil used for lubrication of moving surfaces, usually metallic surfaces, and ranging from small precision machinery (watches) to the heaviest equipment. Lubricating oils usually contain additives to impart special properties such as viscosity and detergency. They range in consistency from thin liquids to grease-like substances.

Lube oils generally range from low viscosity oils with molecular weights as low as 250 to very viscous lubricants with molecular weights as high as about 1000.Physical properties, such as viscosity, viscosity-temperature-pressure characteristics, and performance, depend largely on the relative distribution of paraffinic, aromatic, and alicyclic (naphthenic) components in the lube oil.

Representative petroleum lubricating oils used in this invention include, without limitation, lubes used to lubricate automobiles (SAE), gears (SAE), automatic transmissions, turbines, aviation engines and refrigeration equipment, having the physical properties described by Booser, E. R. in "Lubrication and Lubricants", Kirk-Othmer Concise Encyclopedia of Chemical Technology, pp. 707–710 (1985) incorporated herein by reference. Greases, metal working lubricants and lubricants for missile systems as defined by Booser, E. R. are also of interest in the invention.

Carbon Nanotubes

Definitions

The terms "nanotube", "nanofiber" and "fibril" are used interchangeably. Each refers to an elongated hollow structure having a diameter less than 1 micron. The term "nanotube" includes "nanofiber" or "fibril" (which refers to an elongated solid, (e.g. angular fibers having edges) structures having a cross section of less than 1 micron. The term "nanotube" also includes "bucky tubes" and graphitic nanofibers the graphene planes of which are oriented in herring bone pattern. The term is defined further below.

Graphitic" carbon consists of layers which are essentially parallel to one another and no more than 3.6 angstroms apart.

The term "aggregate" refers to a dense, microscopic particulate structure.

The term "isotropic" means that all measurements of a physical property within a plane or volume of the structure, independent of the direction of the measurement, are of a constant value.

The term carbon nanotubes refers to various tubes or fibers, particularly carbon fibers, having very small diameters including fibrils, whiskers, buckytubes, etc. Such structures provide significant surface area when incorporated into a structure because of their size and shape. Moreover, such nanotubes can be made with high purity and uniformity.

Preferably, the nanotubes used in the present invention have a diameter less than 1 micron, preferably less than about 0.5 micron, and even more preferably less than 0.1 micron and most preferably less than 0.05 micron.

U.S. Pat. No. 5,171,560 to Tennent et al., hereby incorporated by reference, describes carbon nanotubes free of thermal overcoat and having graphitic layers substantially parallel to the fibril axes such that the projection of said layers on said fibril axes extends for a distance of at least two fibril diameters. Typically, such fibrils are substantially cylindrical, graphitic nanotubes of substantially constant diameter and comprise cylindrical graphitic sheets whose c-axes are substantially perpendicular to their cylindrical axis. They are substantially free of pyrolytically deposited carbon, have a diameter less than $0.1\mu$ and a length to diameter ratio of greater than 5. Shorter carbon nanotubes having a length to diameter ratio of less or equal to 5 are also useful in the present invention. These carbon nanotubes are of primary interest in the invention.

When the projection of the graphitic layers on the nanotube axis extends for a distance of less than two nanotube diameters, the carbon planes of the graphitic nanotube, in cross section, take on a herring bone appearance. These are termed fishbone fibrils. Geus, U.S. Pat. No. 4,855,091, hereby incorporated by reference, provides a procedure for preparation of fishbone fibrils substantially free of a pyrolytic overcoat. These carbon nanotubes are also useful in the practice of the invention.

Arc grown nanotubes having a diameter of less than 0.1 microns as made in an electric arc process by Iijima, S., Nature 354, 56 (1991), and catalytically by Amelinckx, S., et al., Science 265, 635 (1994), both incorporated herein by reference are also useful in the practice of the invention.

Carbon nanotubes can be oxidized to yield high surface concentrations of acid groups as described in WO90/02667 and U.S. patent application Ser. No. 08/352,400 filed Dec. 8, 1995 by Moy et al., now U.S. Pat. No. 6,203,814, incorporated herein by reference. The functionalized nanotubes are more readily individualized by shear than "as made" bundles and are readily and highly dispersible in polar solvents. These surface functional groups are also convertible by conventional organic reactions to virtually any desired secondary functionality, thereby providing a wide range of surface hydrophilicity or hydrophobicity. Functionalized nanotubes are also useful in the practice of the invention.

Particularly relevant information regarding carbon fibril technology is summarized in U.S. Pat. No. 4,663,230 to Tennent, U.S. Pat. Nos. 5,165,909; 5,171,560; 5,048,771; 5,110,693 and 5,304,326, all incorporated herein by reference.

Carbon Nanotube Aggregates

Nanotubes are also prepared as aggregates having various morphologies (as determined by scanning electron microscopy) in which they are randomly entangled with each other to form entangled balls of nanotubes resembling bird nests ("BN"); or as aggregates consisting of bundles of straight to slightly bent or kinked carbon nanotubes having substantially the same relative orientation, and having the appearance of combed yarn ("CY") e.g., the longitudinal axis of each nanotube (despite individual bends or kinks) extends in the same direction as that of the surrounding nanotubes in the bundles; or, as, aggregates consisting of straight to slightly bent or kinked nanotubes which are loosely entangled with each other to form an "open net" ("ON") structure.

In U.S. application Ser. No. 08/469,430 entitled "Improved Methods and Catalysts for the Manufacture of Carbon Fibrils", filed Jun. 6, 1995, incorporated herein by reference, Moy et al., now U.S. Pat. No. 6,143,689, describe nanotubes prepared as aggregates having various morphologies as determined by scanning electron microscopy. Carbon nanotube aggregates can also be used as additives in fuels and lubricants.

Carbon Nanotubes as Additives to Fuels and Lubricants

Many fuels and lubricants can benefit from the use of carbon nanotubes as additives.

Carbon nanotubes are added to fuels in an amount from about 0.01% to about 30% by weight, more preferably from about 0.1% to about 10% by weight. The nanotubes may be dispersed in the fuel.

Because lube oils are more viscous than fuels, when carbon nanotubes are used as additives, the loading is preferably from about 0.01% to about 20% by weight.

Typically, the carbon nanotubes useful as additives to fuels and lubricants have an aspect ratio, i.e., length to diameter, of from 1:1 to 500:1 and preferably from 5:1 to 100:1.

Carbon nanotubes as fuel additives offer many advantages. For example, because of their ability to trap free radicals, carbon fibrils can function as an anti-knock additive. Adding carbon nanotubes to diesel fuel results in increasing the cetane number. Carbon nanotubes can act as a burning rate catalyst because when added to liquid fuels they accelerate the burning rate, promote clean burning and suppress smoking.

Carbon nanotubes can enhance the conductivity and improve the toughness of polymeric compositions as more particularly described in U.S. Pat. Nos. 5,591,382 and 5,643,502, both entitled "High Strength Conductive Polymers" and issued to Nahass et al., incorporated herein by reference. When carbon nanotubes are added to fuel in an amount greater than 1%, the fuel becomes conductive and therefore insensitive to electrostatic decomposition (ESD).

For some uses carbon nanotubes in fuels provide an additional safety feature because the nanotubes are thixotropic. The thixotropy of carbon nanotubes and the combustion system can be engineered such that the fuel shear thins as it enters the combustion zone, but does not "liquefy" through an uncontrolled escape.

Carbon nanotubes can act as effective anti-misting additives when added to metal working fluids including those disclosed in U.S. Pat. No. 5,958,849 to Henson, et. al. incorporated herein by reference.

Carbon fibrils can be used as sequestering agents for tramp metals present in engine fuel. Tramp metals and/or tramp metal ions tend to complex with other chemicals found in fuels and lubricants to form insoluble complexes which negatively affect their performance. Adding carbon fibrils to fuels and lubricants containing tramp metals or tramp metal ions will reduce the formation of insoluble complexes and the resulting fuels and lubricants will have fewer insoluble impurities.

Aggregates of carbon nanotubes may also be used as additives to fuels and lubricants. It is known that the morphology of an aggregate is controlled by the choice of catalyst support. A significant concern in using carbon nanotubes in fuels and lubricants, both as single strands and/or as aggregates, is the increased wear of the engine due to abrasion by the fibril growth catalyst support. This is particularly important in automotive fuels, especially for spark ignition engines. Jet and specialty gas turbine fuels may be less sensitive to this concern. As a result friable or easily removable catalyst supports are more desirable than abrasive catalyst supports such as alumina, and the like. Thus, MgO is preferable as catalyst support because it can be easily removed by washing with a weak acid such as 0.1M hydrochloric acid.

Carbon nanotubes grown from a carbon nanotube support rather than a conventional alumina support will contain less residue and are, therefore, of primary interest as additives for use in fuels and lubricants.

In one embodiment of the invention, the carbon nanotubes additives can be delivered to fuels and lubricants in a polymeric matrix. Useful polymeric matrices include polyolefins, especially polyisobutylene, and polyethylene oxide. The content of carbon nanotubes in such delivery systems varies from about 1% by weight to about 30% by weight, and preferably from 2% by weight to 20% by weight. The polymeric matrix and carbon nanotubes are formed into a mixture and the mixture is combined with the fuel such that the fuel contains from about 1 to about 10% by weight of carbon nanotubes in the fuel.

Carbon Nanotubes for Increasing the Viscosity of Fuels and Lubricants

Carbon nanotubes, even in modest concentrations, can significantly increase the viscosity of liquids. For example, ultrasonication of a suspension of fibrils in a thin liquid leads first to isolation of the "as made" bundles from larger aggregates and then to individualization of nanotubes from "as made" bundles. A 1% by weight suspension of such individualized nanotubes, in any inviscid liquid has the consistency of tomato paste, having a viscosity of 10000 to 50000 cp in a Brookfield viscometer at 50 rpm. These values are tripled or quadrupled at lower shear, i.e., 10 rpm. Ultrasonication and removal of the liquid is difficult. Further details regarding carbon fibrils for use in increasing the viscosity of fluids can be found in Shaffer, M. S. P. and Windle, A. H., "Fabrication and Characterization of carbon nanotube/Poly(vinyl alcohol) Composites" Advanced materials 11, (11) 937 (1999); Shaffer, M. S. P., Fan, X. and Windle, A. H., "Dispersion and packaging of Carbon Nanotubes", 36, (11), 1603 (1998); Windle, A, H., et al., "Development of a dispersion process for carbon nanotubes in an epoxy matrix and the resulting electrical properties", Polymer 40 5967 (1999), all of which are incorporated herein by references as if set forth in full.

What is claimed is:

1. A liquid hydrocarbon fuel composition having improved fuel properties containing:
   (a) a petroleum derivative comprising gasoline, gas oil, kerosene, diesel fuel or heavy oil; and
   (b) carbon nanotubes in from about 0.1% to about 10.0% by weight of said fuel, said nanotubes having a diameter less than $0.5\mu$ and a length to diameter ratio of at least 5.

2. A composition as recited in claim 1 wherein said nanotubes are substantially cylindrical, graphitic carbon nanotubes of substantially constant diameter less than $0.1\mu$, comprise cylindrical graphitic sheets whose c-axes are substantially perpendicular to their cylindrical axis, are substantially free of pyrolytically deposited carbon and have a length to diameter ratio from 5:1 to 500:1, said nanotubes being dispersed in said fuel.

3. A composition as recited in claim 1 wherein said nanotubes are substantially cylindrical, graphitic carbon nanotubes of substantially constant diameter less than $0.1\mu$, comprise cylindrical graphitic sheets whose c-axes are substantially perpendicular to their cylindrical axis, are substantially free of pyrolytically deposited carbon and have a length to diameter ratio from 5:1 to 500:1.

4. A method of producing an improved fuel containing carbon nanotubes comprising the steps of:
   (a) forming a mixture of a polymeric matrix and carbon nanotubes, said mixture containing from about 1 to about 30% by weight of carbon nanotubes; and
   (b) combining the mixture formed in step (a) with a petroleum derivative comprising gasoline, gas oil, kerosene, diesel fuel or heavy oil, in such amount as to form a fuel having from about 0.1% to about 10.0% by weight of carbon nanotubes in said fuel. fuel selected from the group consisting a petroleun derivative fuel selected from the group consisting of gasoline, gas oil, kerosene, diesel fuel and heavy oil

* * * * *